US009021706B2

(12) United States Patent
He et al.

(10) Patent No.: US 9,021,706 B2
(45) Date of Patent: May 5, 2015

(54) UNIFIED ROLLING AND BENDING PROCESS FOR ROLLER BEARING CAGES

(75) Inventors: Ming He, North Canton, OH (US); Michael D. Simmons, Canton, OH (US)

(73) Assignee: The Timken Company, North Canton, OH (US)

( * ) Notice: Subject to any disclaimer, the term of this patent is extended or adjusted under 35 U.S.C. 154(b) by 291 days.

(21) Appl. No.: 13/576,188

(22) PCT Filed: Jan. 28, 2011

(86) PCT No.: PCT/US2011/022939
§ 371 (c)(1),
(2), (4) Date: Jul. 31, 2012

(87) PCT Pub. No.: WO2011/094552
PCT Pub. Date: Aug. 4, 2011

(65) Prior Publication Data
US 2012/0297624 A1    Nov. 29, 2012

Related U.S. Application Data

(60) Provisional application No. 61/300,175, filed on Feb. 1, 2010.

(51) Int. Cl.
*B21D 53/10*    (2006.01)
*B21D 53/00*    (2006.01)
(Continued)

(52) U.S. Cl.
CPC .......... *B21D 53/12* (2013.01); *Y10T 29/49643* (2013.01); *B21D 5/08* (2013.01); *B21D 5/12* (2013.01); *B21D 5/14* (2013.01); *B21D 11/08* (2013.01); *F16C 33/543* (2013.01)

(58) Field of Classification Search
CPC ........ B23P 13/04; B23P 17/00; B23P 15/003; B21D 53/10; B21D 52/12; B21K 1/76; B21K 1/04; B21K 1/05; B21B 1/08; B21B 1/00; F16C 33/38; F16C 33/543; F16C 33/42; F16C 33/427
USPC .................... 29/34 R, 557, 558, 898, 898.04, 29/898.048, 898.06, 898.065, 898.067, 29/898.044, 898.049; 72/199–252.5
See application file for complete search history.

(56) References Cited

U.S. PATENT DOCUMENTS 3,623,349 A    11/1971   Hausler
3,692,374 A *   9/1972   Scheifele ...................... 384/570
(Continued)

FOREIGN PATENT DOCUMENTS

CN    1541785        11/2004
DE    2952461 A1     7/1980
(Continued)

OTHER PUBLICATIONS

International Search Report for PCT application PCT/US2011/022939 mailed Jul. 7, 2011.
(Continued)

*Primary Examiner* — Essama Omgba
*Assistant Examiner* — Darrell C Ford
(74) *Attorney, Agent, or Firm* — Michael Best & Friedrich LLP

(57) ABSTRACT

A method of manufacturing large diameter tapered roller bearing cages includes beginning with a metal strip, coil or plate of cage blank material and feeding it into a rolling mill. The rolling mill includes a pair of unparallel forming rolls disposed to define a wedge-shaped gap therebetween. As the cage blank material is fed through the wedge-shaped gap, one lateral side of the cage blank material is plastically deformed to reduce its thickness and to elongate its length, while slight or no deformation is introduced into the other lateral side, thus forming the cage blank into an arc shape. A third roll disposed at the exit side of the forming rolls bends the rolled cage blank into a circular conical ring. Adjacent butt ends of the formed conical ring cage blank are aligned and joined together during the assembly process to form the large diameter tapered roller bearing cage.

13 Claims, 3 Drawing Sheets

(51) Int. Cl.
  *B21D 53/12*  (2006.01)
  *B21K 1/02*  (2006.01)
  *B21B 1/08*  (2006.01)
  *B21B 1/22*  (2006.01)
  *B21B 1/18*  (2006.01)
  *B21B 39/00*  (2006.01)
  *B21B 41/00*  (2006.01)
  *B21D 5/08*  (2006.01)
  *B21D 5/12*  (2006.01)
  *B21D 5/14*  (2006.01)
  *B21D 11/08*  (2006.01)
  *F16C 33/54*  (2006.01)

(56) References Cited

U.S. PATENT DOCUMENTS

| | | | | |
|---|---|---|---|---|
| 3,699,793 | A | * | 10/1972 | Wagner ............ 72/134 |
| 4,109,361 | A | * | 8/1978 | Hagen et al. ............ 29/898.066 |
| 4,132,106 | A | * | 1/1979 | Bihler ............ 72/384 |
| 4,322,879 | A | * | 4/1982 | Warchol ............ 29/898.067 |
| 4,419,800 | A | * | 12/1983 | Bihler et al. ............ 29/898.067 |
| 4,703,641 | A | * | 11/1987 | Yarita et al. ............ 72/247 |
| 4,798,074 | A | * | 1/1989 | Feldmann et al. ............ 72/247 |
| 5,174,144 | A | * | 12/1992 | Kajiwara et al. ............ 72/236 |
| 5,365,664 | A | * | 11/1994 | Whitney, Jr. ............ 29/898.12 |
| 5,755,131 | A | * | 5/1998 | Voth ............ 72/240 |
| 6,220,071 | B1 | * | 4/2001 | Verbickas ............ 72/241.8 |
| 7,251,890 | B2 | * | 8/2007 | Atts ............ 29/894.325 |
| 7,523,554 | B2 | * | 4/2009 | Kimura et al. ............ 29/894.353 |
| 8,814,437 | B2 | * | 8/2014 | Braun ............ 384/572 |
| 8,820,615 | B2 | * | 9/2014 | Dahlman et al. ............ 228/200 |
| 8,881,569 | B2 | * | 11/2014 | Seilinger et al. ............ 72/252.5 |
| 2002/0043087 | A1 | * | 4/2002 | Kobayashi et al. ............ 72/8.9 |
| 2005/0028575 | A1 | * | 2/2005 | Honjo et al. ............ 72/243.6 |
| 2005/0044916 | A1 | * | 3/2005 | Honjo et al. ............ 72/243.6 |
| 2009/0277241 | A1 | | 11/2009 | Jonsson |
| 2009/0314455 | A1 | * | 12/2009 | Reifferscheid et al. ............ 164/413 |
| 2010/0247295 | A1 | * | 9/2010 | Hofmann ............ 415/170.1 |
| 2011/0000271 | A1 | * | 1/2011 | Ogawa et al. ............ 72/241.2 |
| 2013/0020419 | A1 | * | 1/2013 | Brown ............ 241/1 |
| 2014/0245806 | A1 | * | 9/2014 | Yamane et al. ............ 72/202 |
| 2014/0283573 | A1 | * | 9/2014 | Ishii et al. ............ 72/241.2 |

FOREIGN PATENT DOCUMENTS

| | | |
|---|---|---|
| DE | 10320322 A1 | 12/2004 |
| DE | 1032323 A1 | 12/2009 |
| JP | 57079327 | 5/1982 |
| JP | 11101240 | 4/1999 |
| JP | 2004028270 | 1/2004 |

OTHER PUBLICATIONS

Written Opinion of the International Search Authority for PCT application PCT/US2011/022939.
Machine translation of of CN1541785 dated Aug. 25, 2014, 4 pages.
English translation of Office action for Chinese Patent Appln. No. 201180007858.5 received by letter dated Aug. 25, 2014, 6 pages.

* cited by examiner

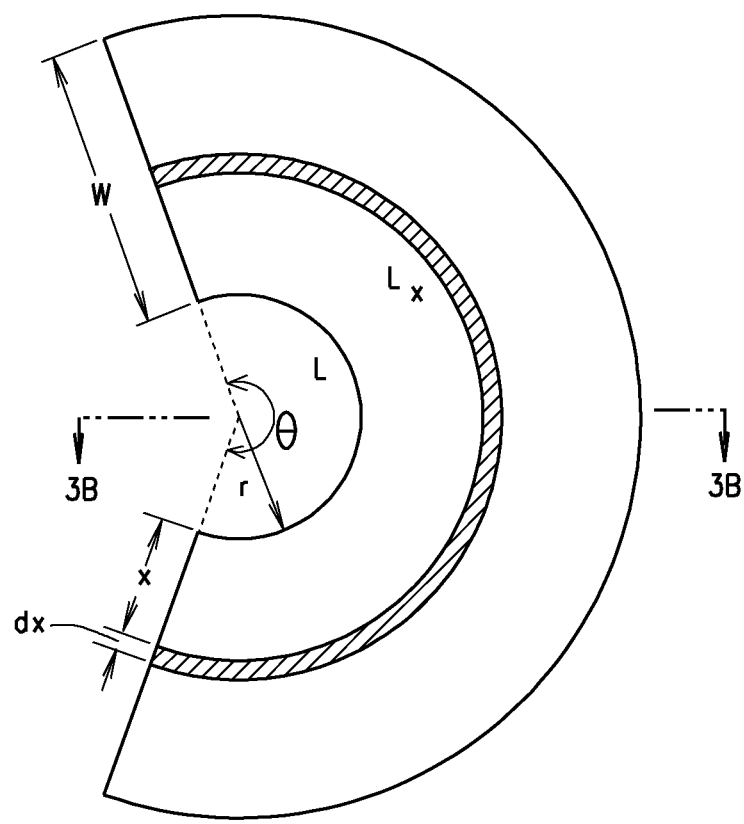
F I G . 3 A
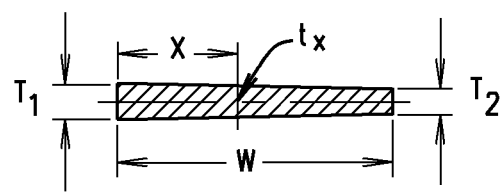
F I G . 3 B

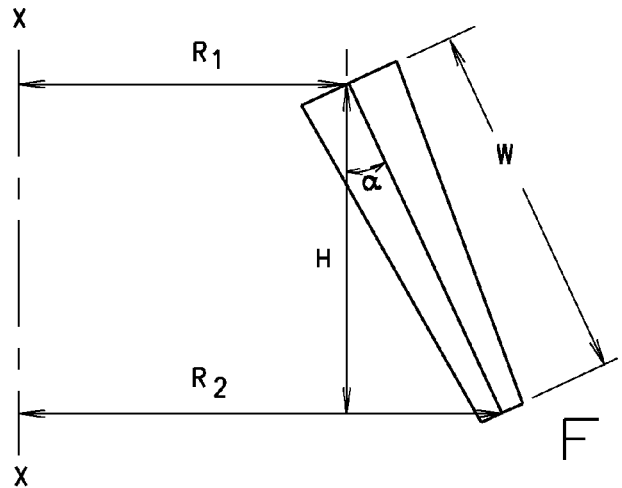
F I G . 4A
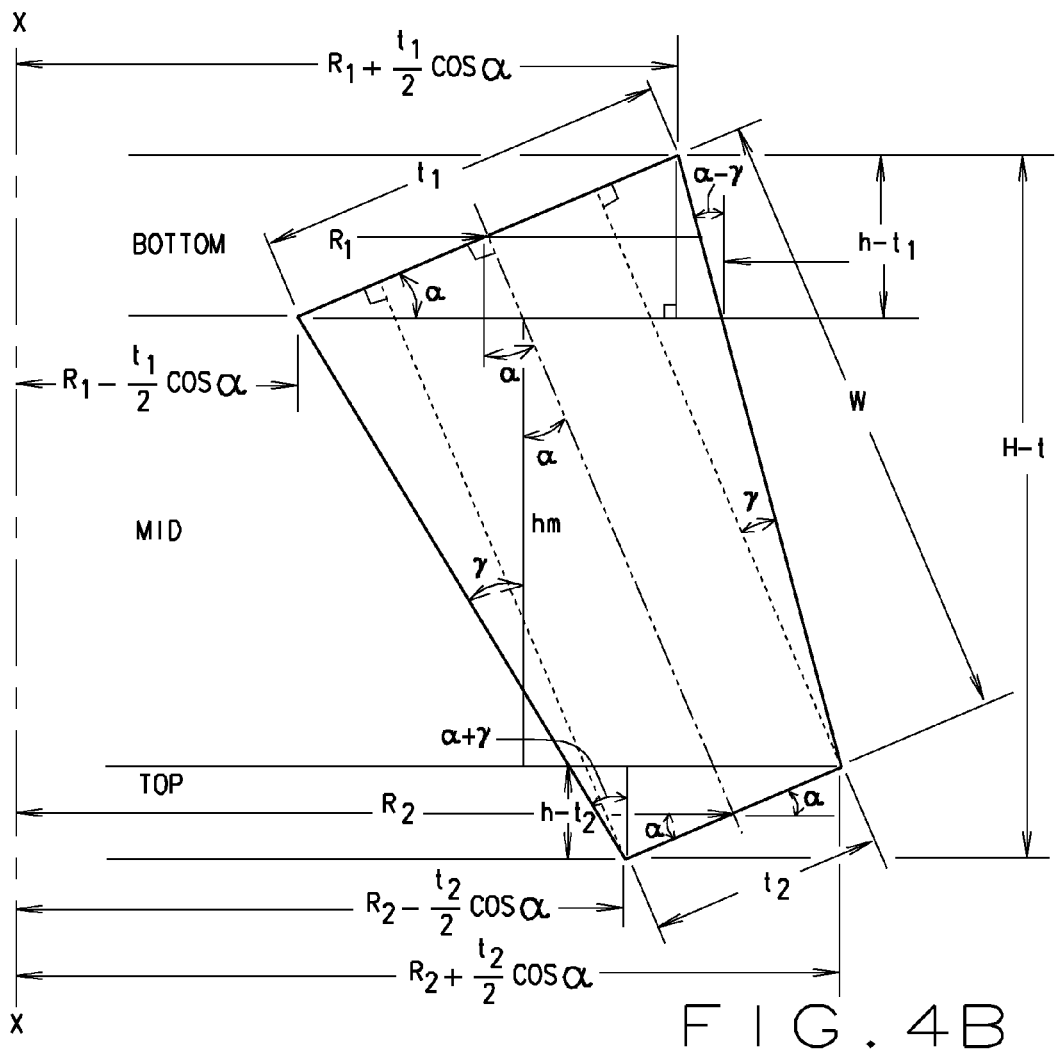
F I G . 4B

UNIFIED ROLLING AND BENDING PROCESS FOR ROLLER BEARING CAGES

CROSS-REFERENCE TO RELATED APPLICATIONS

The present application is related to, and claims priority from, U.S. Provisional Application Ser. No. 61/300,175 filed on Feb. 1, 2010 and International Application PCT/US2011/022939 filed Jan. 28, 2011 and published under International Publication No. WO 2011/094552, both of which are incorporated herein by reference.

STATEMENT REGARDING FEDERALLY SPONSORED RESEARCH

Not Applicable.

BACKGROUND OF THE INVENTION

The present disclosure is related generally to methods for manufacturing large diameter tapered roller bearing cages, and in particular, to a method of manufacture for such tapered roller bearing cages which utilizes straight steel strip or plate material.

Manufacture of large tapered roller bearing cages, which are typically greater than 500 mm in diameter, is challenging work due to the fact that these bearing cages must meet high technical standards, are usually produced in low quantity, require large sized tools, and may be subject to frequent design changes. Currently, large tapered roller bearing cages are produced by spinning or ring rolling/machining processes. Spinning is a cost intensive process requiring part-specific giant mandrels and tailstocks. With increasing cage size, spinning becomes a prohibitive process due to the difficulty of locating a large enough blank for a mandrel to meet the required cage size. The cost of large sized steel plates is also increased exponentially. Similarly, ring rolling and machining processes for large cages are also very expensive.

Accordingly, it would be advantageous to eliminate the use of the part-specific mandrels and tailstocks to significantly reduce the manufacturing costs of large diameter tapered roller bearing cages, especially when the numbers of cage types are large and the annual quantity for each type of cage is small. It would be further advantageous to utilize only straight metal strips, coils, or plates as raw materials in the manufacturing process, thereby reducing material supply problems even when the cage size is large and achieving the maximum material utilization.

Conventional methods for the manufacture of large diameter tapered roller bearing cages, such as spinning or ring rolling/machining processes are limited to working with materials having a maximum thickness, constrained by material formability and the tool load-carrying capacity of the forming process. Accordingly, it would be further advantageous to provide a method of manufacture which is not limited to a maximum thickness of a cage that can be formed.

Finally, it would be beneficial to provide a manufacturing process for large diameter tapered roller bearing cages which is highly flexible for quick part change-over and size adjustment, and which can achieve superior dimensional and geometric precision when utilized with advanced gauge control, feedback and numerical control systems.

BRIEF SUMMARY OF THE INVENTION

Briefly stated, the present disclosure provides a method for manufacturing tapered roller bearing cages, including large diameter tapered roller bearing cages, utilizing straight metal strips, coils, or plates as a raw material. The method begins by feeding a straight metal strip, coil, or plate (cage blank, hereinafter), precisely dimensioned in width, length and thickness, with or without windows or pockets pre-cut, into a rolling mill. The rolling mill incorporates a pair of unparallel forming rolls disposed such that a gap between the rolls is in a wedge configuration. As the cage blank is fed through the wedge-shaped forming roll gap, one side of the cage blank is plastically deformed to reduce its thickness and to elongate its length, while no deformation, or only a very slight deformation, is introduced to the other side of the cage blank. This introduces a linear and uniform reduction of the thickness from zero at one lateral edge to a predetermined amount at the other lateral edge. Thus the originally straight cage blank is formed into an arc shape. A third roll disposed on the exit side of the forming rolls, in a pre-calculated position, bends the rolled cage blank into a circular conical ring. After the entire cage blank is rolled into the conical ring, the conical ring may pass through the rolling mill one more time for a final resizing. The butt ends of the formed conical ring are joined together after any necessary trimming of the portions with inaccurate dimensional and geometric configurations, to form a completed large diameter tapered roller bearing cage.

In an alternate embodiment, a fourth roll is disposed at the entry side of the rolling mill to address a tail section of a formed cage blank having a portion that is flat or has less curvature because of the distance between the forming rolls and the third roll. The fourth roll rises to a pre-determined height to bend the tail of the cage blank to a required curvature before the tail of the cage blank enters the rolling mill.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 3A is a plan view illustrating the calculation of a thickness dimension at the reduced side of the strip or plate material blank of FIG. 2;

FIG. 3B is a sectional view of the strip or plate material blank of FIG. 3A;

FIGS. 4A and 4B illustrate the dimensional designations used for the calculation of the tapered roller bearing cage dimensions;

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 1A:
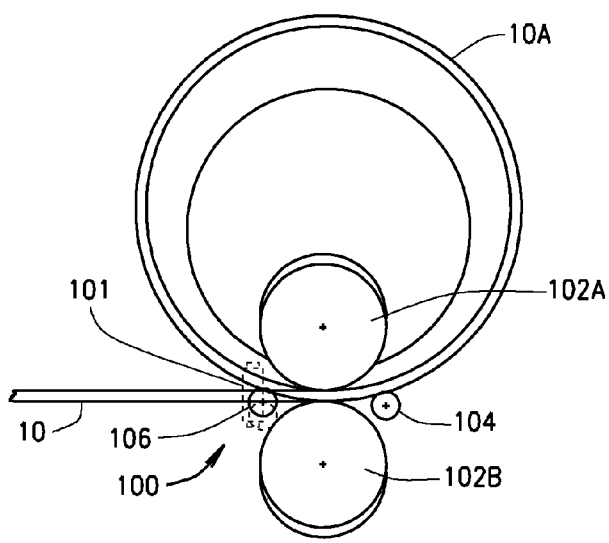
FIG. 1A is a side view of the roll arrangement for the unified cage rolling and bending process of the present disclosure during use.
Figure 1B:
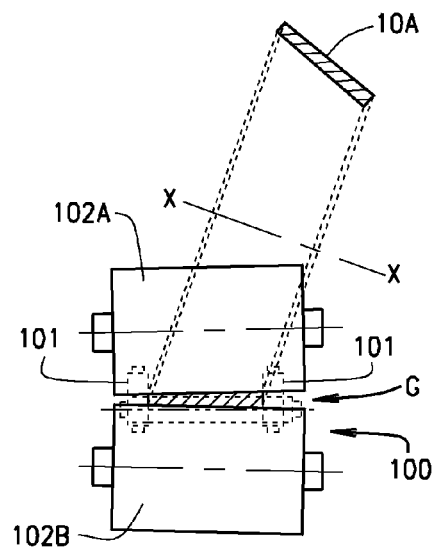
FIG. 1B is an end view of the roll arrangement of FIG. 1A.

Turning to the figures, and to FIGS. 1A and 1B in particular, it is seen that a process of the present disclosure begins with a straight metal strip or plate (cage blank material (10), hereinafter), which has been precisely dimensioned in width, length and thickness. The cage blank material (10) may be formed from any suitable material, such as steel, and may include pre-cut windows or pockets (not shown) for receiving bearing rolling elements.

The windows or pockets on the cage to constrain the bearing rollers can be made before or after the cage is rolled, by a mechanical or non-mechanical means. When the windows or pockets are pre-cut before cage rolling, they can be made into either the final dimensional and geometric configurations, or in a partial finished configuration, which can be finally finished to the specifications after the cage is rolled. To satisfy a uniform and consistent deformation in the cage blank during the both rolling direction and transverse direction, the cut-out portion of the windows or pockets may remain attached to the cage blank material (10) during the rolling operation.

Initially, the cage blank material (10) is fed through lateral guide rolls (101) into a rolling mill (100) configured for the method of the present disclosure, having a pair of forming rolls (102A, 102B) which are arranged unparallel to each other, such that a gap (G) between the forming rolls is wedge shaped, as best seen in FIG. 1B. When the cage blank material (10) goes through the wedge-shaped forming roll gap (G), one lateral side of the cage blank material (10) is plastically deformed so that its thickness is reduced and its length is elongated, while no deformation or very slight deformation will be introduced to the opposite lateral side of the cage blank (10). The deformation of one lateral side of the cage blank material results in the originally straight and flat cage blank material (10) being formed into an arc shape, as seen in FIG. 2B.

As the formed cage blank material (10) exits the forming rolls (102A, 102B), the formed cage blank material (10) engages a third roll (104) in a pre-calculated position which bends the formed cage blank material (10) upward into a circular conical ring (10A). The tail end of the formed cage blank material (10) may have a section that is flat or has less curvature after exiting the forming rolls (102A, 102B) and passing the bending third roll (104), because of the distance between the forming rolls (102A, 102B) and the third roll (104). Optionally, this can be addressed by placing an adjustable fourth roll (106) in the entry side of the rolling mill (100), adjacent to the feed point for the forming rolls (102A 102B). The fourth roll (106) is configured with a suitably controlled actuation mechanism rise to a pre-determined height to bend the tail of the cage blank material (10) to a required curvature before the tail of the cage blank material (10) enters the forming rolls (102A, 102B). After the above-described operations, if inaccurate configurations (such as less curvature) remain in the front and tail ends of the formed cage blank (10A), such portions of the formed cage blank are trimmed. Accordingly, extra length should be given to the cage blank material (10) such that the formed cage blank (10A) achieves the required dimensions.

After the entire cage blank material (10) is rolled into a conical ring configuration of the formed cage blank (10A) having the generally desired dimensions, the formed cage blank (10A) may optionally be passed through the rolling mill (100) one or more times for final resizing. Once the final size is achieved to within a desired tolerance, the adjacent butt ends (12A, 12B) of the formed cage blank (10A) are joined or secured together by any suitable means, such as welding or bonding, to form a complete large diameter tapered roller bearing cage structure (10B).

Figure 2A:
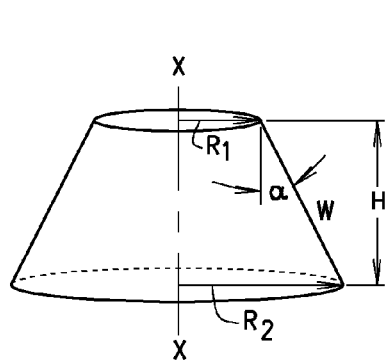
FIG. 2A is an illustration of the large diameter tapered roller bearing cage dimensional designations.
Figure 2C:
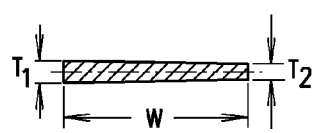
FIG. 2C is a cross-section of the plate material blank of FIG. 2B.
Figure 2B:
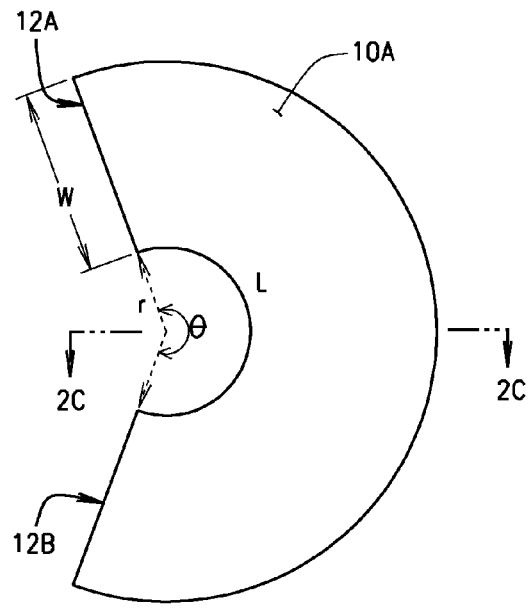
FIG. 2B is an illustration of the strip or plate material blank configuration required to form the conical cage of FIG. 2A using the methods of the present disclosure.

Before a straight strip or plate material can be cut as a cage blank (10) and passed through the forming rolls (102A, 102B), the design of a tapered roller bearing cage should be completed so that the following dimensional parameters (as shown in FIGS. 2A, 2B, and 2C) are available:

$T_1$—Thickness of small diameter end of the finished cage (10B), which is also the starting thickness of the raw strip or plate material prior to forming.

W—Slant height of the finished cage (10B), measured at its neutral plane.

$R_1$—Radius at the neutral plane of the small diameter end of the finished cage (10B).

α—One-half of the included angle of the formed concial cage (10B).

The axial height, H, of the formed cage (10B), measured at its neutral plane, can be calculated from the slant width according to the formula:

$$H = W \cos \alpha \qquad \text{Eqn. 1}$$

The total length of the straight strip or plate material required for forming the formed cage (10B) can be determined by the formula:

$$L = 2\pi R_1 \qquad \text{Eqn. 2}$$

Initially, a straight strip or plate material (1) with pre-determined material properties, such as a metal grade, and thickness $T_1$ is cut to required length L, and slant width W. To achieve the high precision requirements in the final finished or formed bearing cage (10B), the strip or plate material (10) should have a close tolerance in its thickness during the final rolling process and its width in the slitting or cutting process.

The straight cage blank material (10) is fed into the rolling mill (100), on which the gap (G) between the forming rolls (102A, 102B) has a wedge shape, meaning that the two forming rolls (102A. 102B) are not set parallel, so that a linear and uniform reduction of the thickness from zero at one side of the cage blank material (10) to a predetermined amount at the other edge is achieved. Accordingly, such thickness reduction will result in linearly increased elongation in length through the width of the cage blank material (10). When the straight cage blank material (10) is rolled without any bending from the third roll (104), it will form an arc, such as seen in FIG. 2B. The dimensions, r and θ, of the arc can be used for verification purposes, and can be obtained from the calculations of the cage surface area and cage blank arc surface area. The surface area of the bearing cage is expressed as:

$$A_{cage} = \pi W (R_1 + R_2) \qquad \text{Eqn. 3}$$

where:

$$R_2 = R_1 + W \sin \alpha \qquad \text{Eq. 4}$$

The surface area of the arc is expressed as:

$$A_{Arc} = \frac{1}{2}W(2r+W)\cdot\theta \qquad \text{Eqn. 5}$$

where $$r = \frac{2\pi R_1}{\theta} \qquad \text{Eqn. 6}$$

Because $A_{Cage}=A_{Arc}$, it will be seen that $$\theta = 2\pi\sin\alpha \qquad \text{Eqn. 7}$$

and $$r = \frac{R_1}{\sin\alpha} \qquad \text{Eqn. 8}$$

After rolling, one side of the cage blank (10A) will have reduced thickness $T_2$ as shown in FIGS. 2C and 3B. The theoretical value of $T_2$ can be calculated from the following equations:

The thickness reduction at the reduced side of the cage blank (10A) from the original thickness $T_1$ is $$\Delta T = T_1 - T_2 \qquad \text{Eqn. 9}$$

The volume of the cage blank is:

$$V_0 = LT_1W \qquad \text{Eqn. 10}$$

The volume of the rolled arc for the same cage blank is:

$$V_1 = \int_0^W L_x t_x dx \qquad \text{Eqn. 11}$$

where $$L_x = (r+x)\cdot\theta \qquad \text{Eqn. 12}$$

$$\theta = \frac{L}{r} \qquad \text{Eqn. 13}$$

$$t_x = T_1 - \frac{x}{W}\Delta T \qquad \text{Eqn. 14}$$

By substitution, Equation 11 can now be expressed as:

$$V_1 = \int_0^W \frac{L}{r}(r+x)\left(T_1 - \frac{x}{W}\Delta T\right)dx$$

$$= L\left[T_1W + \frac{W^2}{6r}(3T_1 - 2\Delta T) - \frac{1}{2}W\Delta T\right] \qquad \text{Eqn. 15}$$

By equating $V_0$ and $V_1$, the thickness reduction of the cage blank (10A) as it is passed through the forming rolls (102A, 102B) can be obtained as:

$$\Delta T = T_1\left(\frac{3W}{3r+2W}\right) \qquad \text{Eqn. 16}$$

The thickness $T_2$ at the reduced side is:

$$T_2 = T_1\left(\frac{3r-W}{3r+2W}\right) \qquad \text{Eqn. 17}$$

where r is obtained from Equation 8.

The gap (G) of the forming rolls (102A, 102B) is set up by $T_1$ (largest distance), $T_2$ (shortest distance), and W (distance between guide rolls). These dimensions should be reliably and consistently maintained during the entire rolling process to form a cage blank (10B) without any dimensional and geometric distortions.

After rolling and bending, the formed cage (10B) should satisfy the following diametric dimensions, as shown in FIG. 4, before trimming or machining any part of the cage blank:

The theoretical small-end inner (SEI) diameter is:

$$D_{SEI} = 2R_1 - T_1\cos\alpha \qquad \text{Eqn. 18}$$

The theoretical small end outer (SEO) diameter is:

$$D_{SEO} = 2R_1 + T_1\cos\alpha \qquad \text{Eqn. 19}$$

The theoretical large end inner (LEI) diameter is:

$$D_{LEI} = 2R_2 - T_2\cos\alpha \qquad \text{Eqn. 20}$$

The theoretical large end outer (LEO) diameter is:

$$D_{LEO} = 2R_2 + T_2\cos\alpha \qquad \text{Eqn. 21}$$

The theoretical total height of the cage (from tip to tip) is:

$$H_{Total} = h_{T_1} + h_{T_2} + h_m \qquad \text{Eqn. 22}$$

where $$h_{T_1} = T_1\sin\alpha \qquad \text{Eqn. 23}$$

$$h_{T_2} = T_2\sin\alpha \qquad \text{Eqn. 24}$$

$$h_m = \left[W\cos\alpha - \frac{1}{2}(T_1+T_2)\sin\alpha\right] \qquad \text{Eqn. 25}$$

As the cage blank material (10) travels through the roll gap (G) between the forming rolls (102A, 102B), the third roll (104) that is placed in the exit of the forming rolls (i.e. at the exit point for the rolled cage blank (10A)) in a pre-calculated position, will then bend the rolled cage blank (10A) into a circular conical ring as seen in FIGS. 1A and 1B. The tail of the cage blank (10A) may have a section that is flat or has less curvature because of the distance between the forming rolls (102A, 102B) and the third roll (104). This problem may be solved by placing an adjustable fourth roll (106) in the entrance of the rolling mill (100). This fourth roll configured with a suitable actuation and control mechanism to rise to a pre-determined height to bend the tail of the cage blank material (10) to a required curvature before it enters the roll gap (G) between the forming rolls (102A, 102B).

After the entire cage blank (10A) is rolled into a circular conical ring, the conical ring cage blank can be passed through the rolling mill (100) one or more times for final resizing.

Preferably, the rolling mill (100) is equipped with automatic gauge control (AGC) and close-loop feedback (CLFB) systems, as well as a CNC system, for the forming rolls so that high precision and repeatability in the formed cage (10B) can be maintained. The third roll (104) and optional fourth forming roll (106) are preferably integrated into the rolling mill AGC, CLFB and CNC systems to maintain the required positioning, precision, and repeatability. Because of the wedge-shaped forming roll gap (G), during rolling, the cage blank (10A) will move laterally towards the larger portion of the roll gap (G). A group of lateral guide rolls (101) at the entrance and exit ends of the rolling mill need to be provided to secure the cage blank (10A) in the designated lateral position during the rolling process. The lateral guide rolls (10) are preferably adjustable in their lateral spacing to fit a wide range of cage blank widths.

Considering that the resulting formed bearing cage (10B) may have perforated windows or pockets to provide constraint to the bearing rollers, the cage blank (10A) can also be pre-perforated by mechanical or non-mechanical means with exact final-sized or smaller-sized windows or pockets before rolling and bending. There are several advantages to pre-perforation of the cage blank (10A). For example, the pre-perforation process when the cage blank (10A) is flat requires simpler tooling, machine setup and programming and requires less setup time and manufacturing time, and therefore reduces cost. Additionally, the pre-perforation process may reduce non-uniform distribution of residual stresses and thus reducing distortion of the cage during the forming process. Undersized windows or pockets will be brought to their final dimensions and geometric configurations by machining or other manufacturing methods after the cage blank (10A) is formed and rolled by the rolling mill (100). To satisfy a uniform and consistent deformation in the cage blank material (10) in the both rolling direction and transverse direction, the perforated portion of the windows or pockets may remain attached to the strip during rolling.

Preferably, the rolling mill (100) is equipped with proper material handling apparatus to support and guide both the unrolled and the rolled portions of the cage blank (10A) so that no influence of gravity and motion of the portion of the cage blank (10A) that is outside the rolling mill will be imparted on the rolling and bending process. This material handling apparatus can be adjusted in size to fit a range of tapered roller bearing cage diameters, which will typically exceed 500 mm.

As various changes could be made in the above constructions without departing from the scope of the disclosure, it is intended that all matter contained in the above description or shown in the accompanying drawings shall be interpreted as illustrative and not in a limiting sense. Those of ordinary skill in the art will recognize that while the methods and apparatus of the present disclosure have been described for use in producing tapered roller bearing cages having diameters which equal or exceed 500 mm, the method and apparatus may be configured to produced tapered roller bearing cages which are smaller than 500 mm without departing from the scope of the invention.

The invention claimed is:

1. A method for manufacturing a tapered roller bearing cage (10B), comprising:
    providing a straight segment of cage blank material (10), precisely dimensioned in width, length, and thickness selected to achieve finished dimensions of the tapered roller bearing cage (10B);
    feeding said straight segment of cage blank material (10) into a rolling mill (100), said rolling mill incorporating a pair of unparallel cylindrical forming rolls (102A, 102B) disposed such that a gap (G) between the forming rolls through which said cage blank material is fed has a wedge shape;
    plastically deforming said straight cage blank material (10) into an arc shape by passage through said gap (G) to reduce a thickness, and to elongate a length, of one lateral side of said cage blank material (10), such that the cage blank material increases in thickness from the one lateral side to another lateral side;
    passing said arc of cage blank material over a bend-inducing roll (104), said bend-inducing roll (104) bending the arc of cage blank material into a circular conical ring (10A); and
    securing opposite butt ends (12A, 12B) of said conical ring of cage blank material (10A) together to form said tapered roller bearing cage (10B).

2. The method for manufacturing of claim 1 further including the step of pre-cutting windows or pockets in said straight segment of cage blank material (10) prior to said feeding step.

3. The method for manufacturing of claim 1 further including the step of selectively positioning said bend-inducing roll (104) relative to said forming rolls (102A, 102B) to impart a selected radius into said conical ring of cage blank material (10A) passing through said gap (G).

4. The method for manufacturing of claim 1 where said step of securing opposite butt ends (12A, 12B) of said conical ring of cage blank material (10A) together includes joining said opposite butt ends together.

5. The method for manufacturing of claim 1 further including the step of feeding said conical ring of cage blank material (10A) through said rolling mill (100) at least once before securing said opposite butt ends (12A, 12B) together to form said tapered roller bearing cage (10B).

6. The method for manufacturing of claim 1 further including the step of imparting a bend to a tail end of said straight cage blank material (10) prior to plastically deforming said straight cage blank material within said gap (G) between said forming rolls (102A, 102B).

7. The method for manufacture of claim 6 wherein said step of imparting a bend further includes selectively engaging a roll (106) with said tail end of said straight cage blank material (10) before plastically deforming said straight cage blank material with said forming rolls (102A, 102B).

8. The method for manufacture of claim 1 further including the step of securing said cage blank material (10) against lateral displacement during said step of plastic deformation within said rolling mill (100).

9. The method for manufacture of claim 1 wherein said gap (G) between said forming rolls is selected in response to a measure of the thickness ($T_1$) of the cage blank material at a first lateral edge, a measure of the thickness ($T_2$) of the cage blank material at a second lateral edge, and a measure of the lateral distance (W) between the first and second lateral edges.

10. The method for manufacture of claim 1 further including the step of monitoring one or more dimensions of said cage blank material (10) during said plastic deformation by said forming rolls (102A, 102B) and utilizing said monitored dimensions in an automatic gauge control and closed-loop feedback system of said rolling mill (100) to adjust one or more settings associated with said forming rolls.

11. The method for manufacture of claim 1 further including a step of trimming said conical ring of cage blank material (10A) to final dimensions prior to said step of securing opposite butt ends together to form said tapered roller bearing cage (10B).

12. The method for manufacture of claim 1 wherein said step of securing opposite butt ends together to form said tapered roller bearing cage (10B) forms a cage having an internal diameter of at least 500 mm.

13. A method for manufacturing a tapered roller bearing cage (10B), comprising:
    providing a straight segment of cage blank material (10), precisely dimensioned in width, length, and thickness selected to achieve finished dimensions of the tapered roller bearing cage (10B);
    feeding said straight segment of cage blank material (10) into a rolling mill (100), said rolling mill incorporating a pair of unparallel cylindrical forming rolls (102A, 102B)

disposed such that a gap (G) between the forming rolls through which said cage blank material is fed has a wedge shape;

plastically deforming said straight cage blank material (10) into an arc shape by passage through said gap (G) to reduce a thickness, and to elongate a length, of one lateral side of said cage blank material (10), such that the cage blank material increases in thickness from the one lateral side to another lateral side;

passing said arc of cage blank material over a bend-inducing roll (104), said bend-inducing roll (104) bending the arc of cage blank material into a circular conical ring (10A); and securing opposite butt ends (12A, 12B) of said conical ring of cage blank material (10A) together to form said tapered roller bearing cage (10B) having an internal diameter of at least 500 mm.

* * * * *